Aug. 31, 1965    E. W. GLIDDEN ETAL    3,203,039
REMOVAL OF MEAT FROM SEPARATED SECTIONS OF THE
LEGS OF KING CRAB
Original Filed Oct. 1, 1963    2 Sheets-Sheet 2
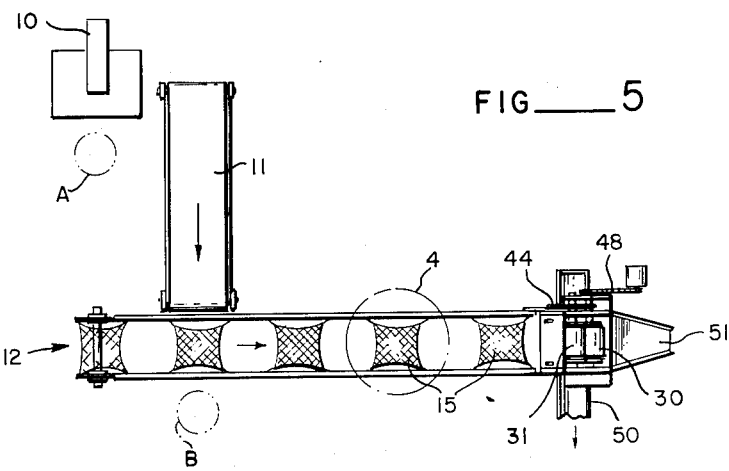
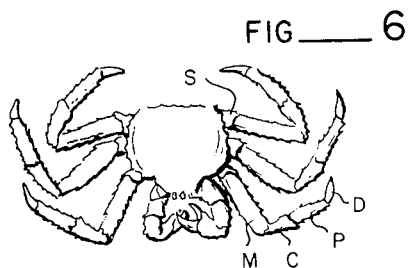
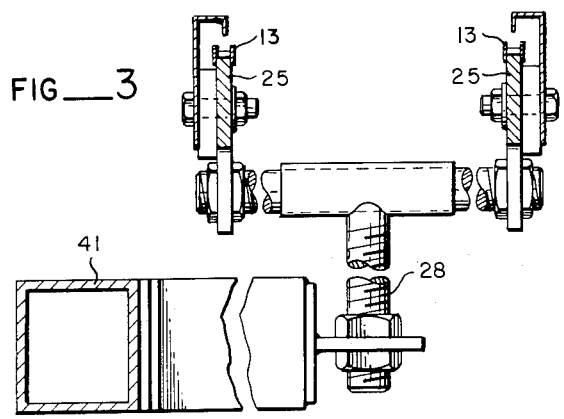
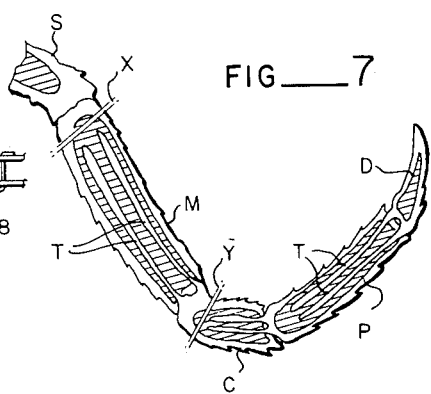
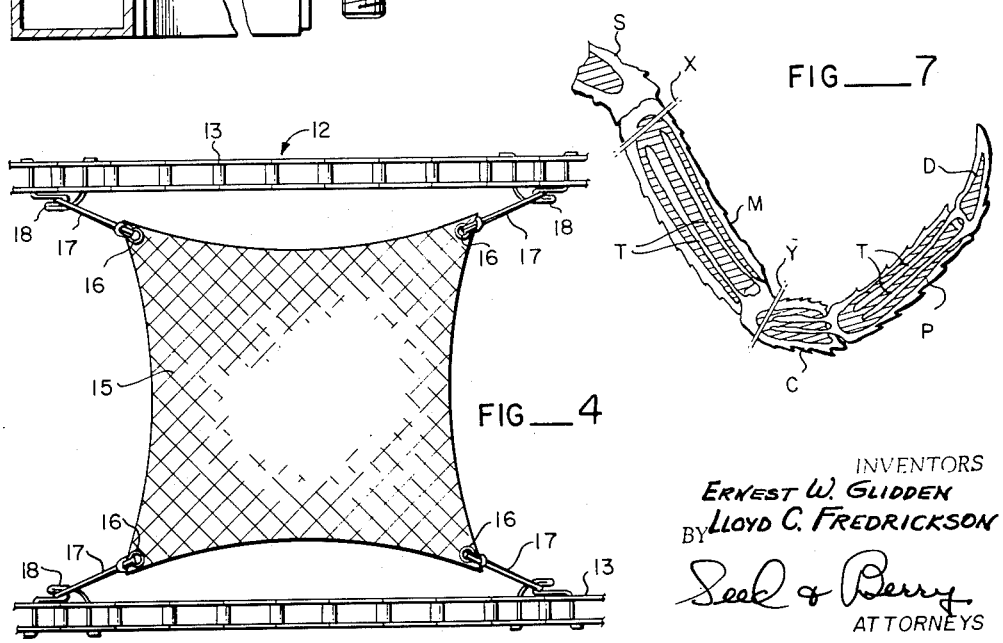
INVENTORS
ERNEST W. GLIDDEN
LLOYD C. FREDRICKSON
BY
ATTORNEYS

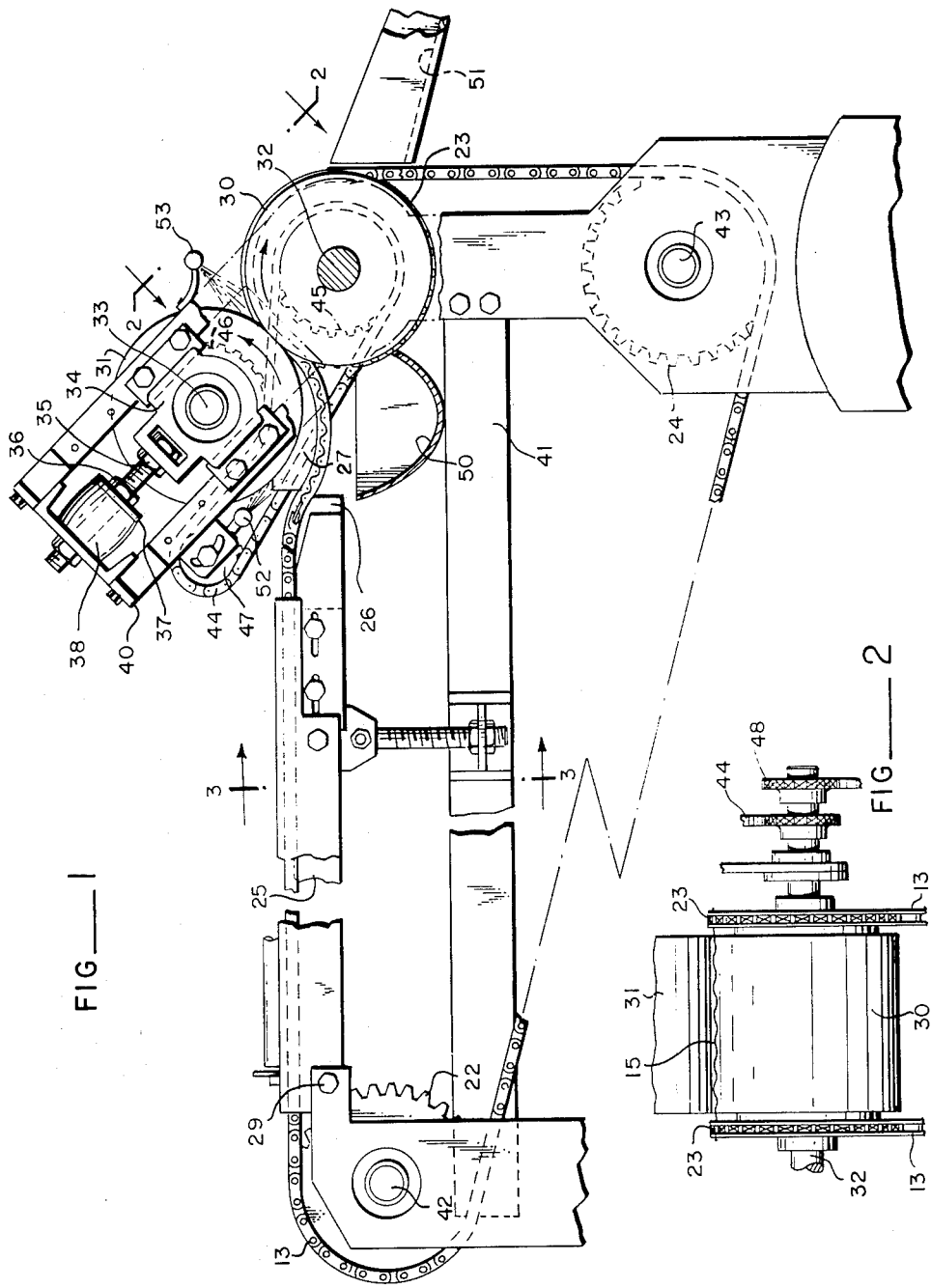

United States Patent Office

3,203,039
Patented Aug. 31, 1965

3,203,039
REMOVAL OF MEAT FROM SEPARATED SECTIONS OF THE LEGS OF KING CRAB
Ernest W. Glidden, Seattle, and Lloyd C. Fredrickson, Bellingham, Wash., assignors to Wakefield Seafoods, Inc., Seattle, Wash., a corporation of Washington
Original application Oct. 1, 1963, Ser. No. 313,011. Divided and this application Nov. 9, 1964, Ser. No. 409,768
6 Claims. (Cl. 17—45)

The present application is a division of our co-pending application for Letters Patent of the United States filed Oct. 1, 1963, Ser. No. 313,011. The invention relates to a method for removing meat from the legs of king crab, the method being of the squeeze character in which a leg which has been severed from the body of the crab is fed between a pair of complementing resiliently-faced live rollers so located and driven in converse directions of rotation as to produce a progressively narrowing infeed throat leading to a nip.

When a king crab leg is severed from the body of the crab, the leg presents five articulating sections which narrow progressively toward the tip end, said sections being the coxa, the merus, the carpus, the propodus, and the dactylus, the coxa being the inner or shoulder section and the dactylus being the outer or tip section. Constricting cartilage separates these several sections at the joints. Tendons are rooted to such cartilage at the outer end of each section and extend longitudinally therefrom for approximately the full length of the section through the contained meat.

As practiced prior to the advent of the present invention, the processing of king crab legs by application of squeeze pressure thereto has been one in which the whole leg is fed, tip-end first, between the pressure-applying rollers. Progressing compressive pressure of the rolls squeezes the meat from the propodus and dactylus sections into the carpus section against the meat contained therein, then pushes this meat into the merus section against the meat of the merus section and from the merus section pushes the meat into the shoulder section to issue in inverse order, i.e. coxa, merus, carpus, propodus, dactylus, from the end opening produced when the leg was severed from the body of the crab. Meat from each smaller section of the leg must perforce have traversed not only the length of its own section and a following larger section or sections but must also have been forced to squeeze through the constricted openings, occurring at the joints, which the cartilage produces. There is the added problem of having to traverse an angular path in that the carpus and merus sections normally assume rather a sharp angular relationship, one to the other. The merus and the shoulder piece also normally assume an angular relationship, albeit less sharp. The result of any substantial amount of back pressure upon the meat being expelled is that the meat issues in shreds, appreciably reducing the market value by comparison with that of chunk meat which is of course the looked-for product from the squeeze technique. While a layer of fat surrounds the meat in a king crab leg and is relied upon to lubricate the meat as it is forced along the length of the leg, the fat layer must be comparatively thick if sufficient lubrication is to be provided that the forces to which the meat is subjected will not cause the same to lose its chunk form. King crab taken in the off-season have very little fat and this condition also obtains even at a prime period when the feeding grounds are poor. Squeeze-processing has not heretofore been overly successful in producing any substantial amount of chunk meat excepting where the crab being processed has considerable fat, and as above stated this occurs only when the crab is in prime condition. The supply of prime crab which is harvested is inadequate to meet more than a small part of the market which king crab enjoys.

Having in mind the foregoing disadvantages of prior squeeze processes for removing meat from severed legs of king crabs, employing companion resiliently faced rollers as the agent for producing squeeze pressure, the present invention aims to provide a squeeze process improved in the sense that an optimum amount of the removed meat is in chunk form regardless of whether the concerned crab is or is not in prime condition.

This and other more particular objects and advantages of the invention will appear and be understood in the course of the following description and claims, the invention consisting in the advanced method of processing a severed crab leg hereinafter described and claimed.

In the accompanying drawings:
FIGURE 1 is a fragmentary side elevational view illustrating the conveyor and pressure-roll parts of a machine suitable for practicing the present process.
FIG. 2 is a fragmentary end elevation of the pressure-roll part viewed from the vantage point 2—2 of FIG. 1.
FIG. 3 is a fragmentary transverse vertical sectional view drawn to an enlarged scale on line 3—3 of FIG. 1.
FIG. 4 is an enlarged-scale top plan view of a fragmentary part of the feed conveyor.
FIG. 5 is a fragmentary schematic plan view of the complete machine to include a showing of a cutting station where cuts vital to the present process are made upon crab legs which have been previously severed from the body of the crab.
FIG. 6 is a top plan view of a king crab; and
FIG. 7 is a schematic illustration of a severed crab leg showing the locations at which said cuts are made to divide the leg into separated pieces.

The cuts which the present process makes upon the crab leg separate the latter into three pieces and are designated by $x$ and $y$, being preferably made by a band saw 10 and being located one cut at the large end of the merus section M and one cut at the large end of the carpus section C. These cuts are rather precisely placed so as to lie beyond the free ends of the contained tendons T but short of, albeit close to, the respective membrane which occurs at the joint. One piece is comprised largely of the coxa or shoulder S, with a bit of the merus section at the small end. A second piece is comprised largely of the merus section, with a bit of the carpus section at the small end. The third piece comprises the carpus section together with the propodus P and the dactylus D. As previously pointed out, these latter three sections normally assume almost an in-line relationship, and the passage-choking membranes which provide articulation between the dactylus and propodus and between the propodus and the carpus are quite thin by comparison with the membranes which lie between the carpus and merus and between the merus and coxa so as not to unduly stress crab chunks squeezed through these sections.

In the drawings two operator's stations are circled by the letters A and B. It is the function of the operator who occupies station A to make the saw-cuts upon the crab legs. The cut sections of crab leg are placed from the saw table upon the horizontal upper run of an endless conveyor belt 11, hereinafter termed the supply conveyor. Station B lies at the tail end of the supply conveyor. The operator occupying station B removes the leg sections from such supply conveyor and transfers same to the horizontal upper run of a second endless conveyor 12 hereinafter termed the feed conveyor. In this transfer the leg sections are so placed upon the feed conveyor that the leg section generally parallels the longitudinal median line of the conveyor, with the large end of the leg section (i.e. the end most proximal to the root) facing to the rear. The longitudinal median lines of the two conveyors are disposed normal to one another as a convenience to the operator occupying station B.

Along each of its two sides the conveyor 12 has a respective chain 13, and stretched between these chains to occupy positions at equidistantly spaced intervals of the conveyor's length are flights 15, or hammocks as they will be hereinafter termed. Generally square in plan configuration, these hammocks are mesh and have grommets 16 in each of the four corners from which diagonal rubber bands 17 extend to hooks 18 which are carried by the chains. The interstices of the hammock are moderately large, say ¼". The hammocks are either rubber or rubber-coated. The length of the hammocks approximates the length of the longest leg sections which are to be carried thereby. The spaces between the hammocks are or may be moderately longer.

To prescribe the travel path of said feed conveyor the chains are trained about three sets of transversely spaced apart co-axial sprocket wheels 22, 23 and 24. Sprocket wheels 22 and 23 lie at the head and tail ends, respectively, of the conveyor's upper run, and in its progression along said upper run the chains are constrained to travel along an established path by means of a series of guide rails 25, 26 and 27. Guide 25 occupies a generally horizontal plane and extends for the greater part of the run with its front end sustained by a jack-screw 28 for minor vertical adjustment about a rear pivot 29. Guide 26 extends forwardly as a prolongation of the guide 25, is carried for endwise adjustment relative thereto, and has its outer end curved downwardly. The chains ride over the guide rails 25 and 26 and under the guide rail 27 which has a curved configuration initially continuing the downward curve of the guide 26 and thence bending upwardly on a merging arc developed tangent to the sprocket wheels 23 about a center occupying a line which is projected radial to the axis of such sprocket wheels and biased toward said guided portion of the conveyor's travel path approximately 45° from the vertical.

30 and 31 designate the two resiliently faced companion rolls which exert squeeze pressure upon crab leg sections carried by the feed conveyor. Roller 30 occupies the space between the two sprocket wheels 23, has a diameter corresponding to that of the sprocket wheels, and is fast to a common live spindle 32 so as to turn in unison with the sprocket wheels. Squeeze roller 31 has a similar diameter and is fixed to a live spindle 33 of opposite rotation journaled for rotation about an axis lying parallel to that of the spindle 32 on said radially projected line to which the guide 27 is tangent. The nip of the rolls thus faces toward the rear end of the feed conveyor and coincides with the tail extremity of such guide rails 27.

The journal mounting for the spindle 33 is comprised of boxes 34 mounted for slide motion toward and from the spindle 32. The boxes are given a yielding setting by bolts 35 and adjusting nuts 36, the nuts bearing against thrust washers 37 which bear in turn upon blocks 38 composed of elastic rubber or other like or suitable resilient material.

Stanchions 40 rigid with a frame-work 41 which carries journals for the spindle 32 and for shafts 42 and 43 for the two sets of sprocket wheels 22 and 24, respectively, provide ways on which the boxes 34 slide. An endless chain 44 is trained from a sprocket wheel 45, fast to the spindle 32, over a sprocket wheel 46 fast to the spindle 33 and thence about an adjustably mounted tensioning wheel 47.

An electric motor acts through a chain 48 to drive the spindle 32.

Water from perforated manifold pipes 52 and 53 is constantly sprayed on the surfaces of the two squeeze rollers.

As leading ends of the conveyed crab leg sections reach the nip of the rolls the sections become squeezed and force the meat from the trailing end. Such meat is in unbroken chunks substantially free of shreds and drops off the after edge of the concerned hammock, falling into a transversely sloped receiving trough 50 which underlies the squeeze zone. The trough leads laterally to a meat-handling station. The empty crushed crab shells pass between the squeeze rolls and are deposited upon an apron 51 which leads to a refuse conveyor. The leg sections are desirably in a chilled condition when the meat is extracted by the pressure of the rolls.

It is thought that the invention will have been clearly understood from the foregoing detailed descrptiion. It is important to note that the rolls tend to refuse the leg sections as the latter in their travel with the conveyor are brought into the nip. This is a consequence of the rather thick hard shell of a king crab leg, making the shell especially resistant to collapse under force of squeeze pressure. Countering this refusal, the sharp spines which occur at comparatively close intervals on the exterior surface of the shell catch in the interstices of the mesh hammocks and effectively hold the conveyed leg sections against kickback. As the shell proceeds with the conveyor through the rolls and issues from the back side of the latter the shell travels a steep downward path in course of which the spines dislodge themselves from the interstices and the shell drops free.

What we claim is:

1. The method of extracting meat in chunk form from a king crab leg: comprising severing the leg from the body of the crab in a manner retaining the shoulder section upon the leg, then dividing said leg into three separated pieces by cutting through the leg on two planes which are each generally transverse to the leg with one of said two planes of cut being in the merus section of the leg proximate to but spaced from the large-end extremity thereof and with the other of said two planes of cut being in the carpus section of the leg proximate to but spaced from the large-end extremity of said carpus section, and subjecting each of the separated pieces to yielding compression pressure starting at the small end of the piece and progressing therefrom the length of the piece to cause the chunks of meat contained in each of said pieces to be expelled through the opening in the large end thereof which, in the instance of the shoulder piece, was provided by severing the leg from the body of the crab and, in the instance of the other two pieces, by said transverse cuts.

2. The method claimed in claim 1 in which the transverse cuts are made by sawing.

3. The method claimed in claim 1 in which the pieces are in a chilled condition when subjected to the meat-expelling pressure.

4. The method of extracting meat from a king crab leg having an opening in the large end, comprising depositing the leg, small-end first, upon a conveyor moving along an established path in course of which the conveyor passes between a pair of counter-rotating pressure rollers entering at the nip thereof, and retarding the counter kickback refusal by the rollers of the entering leg through providing positive engagement between the spines of the conveyed leg and the conveyed surface.

5. The method of extracting meat in chunk form from the part of a king crab leg which includes the dactylus, propodus, and carpus sections: comprising cutting through the part on a plane which is generally transverse to the carpus section proximate to but spaced from the large end extremity thereof and thereby separating the part from the joint which connects said part with the merus section and at the same time producing an opening in the large end of the carpus section, and subjecting said part to yielding compression pressure progressing the approximate length of the part from the small toward the large end to cause the chunk of meat contained in the dactylus, propodus, and carpus sections to be expelled through said produced opening.

6. The method of extracting meat in chunk form from the merus section of a king crab leg: comprising separating said section both from the carpus section and from the joint which connects said merus section with the coxa section by making two severing cuts one through the merus section and the other through the carpus section, the cut made through the merus section being generally transverse to the merus section proximate to but spaced from the large end extremity thereof to produce an opening in the large end of the merus section, and subjecting said merus section to yielding compression pressure progressing the approximate length of the section from the small toward the large end to cause the chunk of meat contained in the merus section to be expelled through said produced opening.

References Cited by the Examiner
UNITED STATES PATENTS 2,660,754 12/53 Roshko _____ 17—2
2,987,759 6/61 Lapeyre et al. _____ 17—2

SAMUEL KOREN, *Primary Examiner.*

LUCIE H. LAUDENSLAGER, *Examiner.*